United States Patent [19]

Burgdorf et al.

[11] 4,426,117
[45] Jan. 17, 1984

[54] BRAKE PRESSURE CONTROL VALVE AND A METHOD FOR ITS ASSEMBLY

[75] Inventors: Jochen Burgdorf, Offenbach-Rumpenheim; Karl Keiner, Schoeffengrund, both of Fed. Rep. of Germany

[73] Assignee: ITT Industries, Inc., New York, N.Y.

[21] Appl. No.: 296,394

[22] Filed: Aug. 26, 1981

[30] Foreign Application Priority Data

Oct. 3, 1980 [DE] Fed. Rep. of Germany ....... 3037459

[51] Int. Cl.³ .............................................. B60T 8/26
[52] U.S. Cl. .................................................... 303/6 C
[58] Field of Search ............... 188/349; 303/6 C, 6 R, 303/22 R, 22 A

[56] References Cited

U.S. PATENT DOCUMENTS 3,598,451  8/1971  Doerfler ............................ 303/6 C
3,727,989  4/1973  Keady ................................. 303/6 C

*Primary Examiner*—Duane A. Reger
*Attorney, Agent, or Firm*—James B. Raden; William J. Michals

[57] ABSTRACT

A brake pressure control valve for a vehicular brake system comprises a stepped piston having a large-diameter portion guided in a bore of a threaded housing plug and a small-diameter portion guided in a bore formed in a housing for the control valve. At the end of the piston adjacent an inlet, an axial channel has a valve seat in a cooperative relation with a closure member. The piston is displaceable from its inactive position in a valve closing direction against the force of a valve spring bearing against a fixed stop. The fixed stop is fastened to the threaded plug to rovide a predetermined preload of the valve spring. With the aid of the threaded plug, the valve closure travel can be adjusted very precisely. The pressure control valve is formed by two constructional units each of which can be preassembled, thereby providing ease of assembly, mounting and replacement.

14 Claims, 1 Drawing Figure

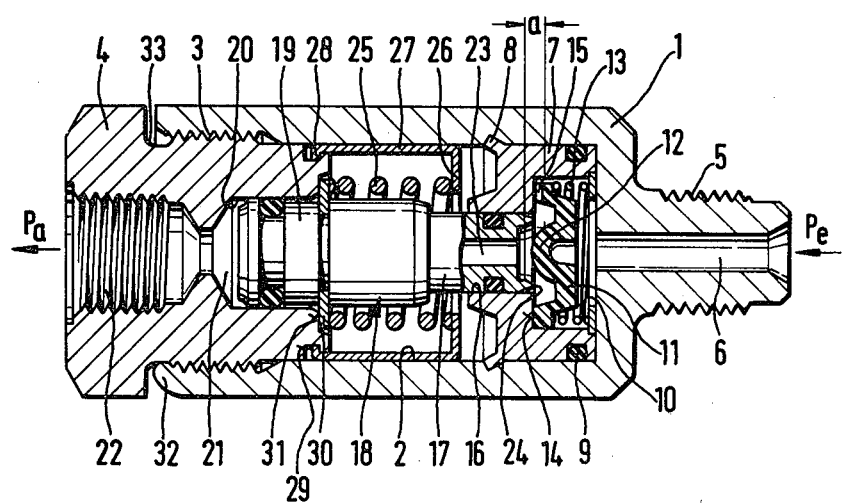

BRAKE PRESSURE CONTROL VALVE AND A METHOD FOR ITS ASSEMBLY

BACKGROUND OF THE INVENTION

The present invention relates to a brake pressure control valve for vehicular brake systems comprising a housing having a threaded plug at its outlet; a stepped piston having its larger-diameter portion guided in a bore of the threaded plug and its smaller-diameter portion guided in a bore formed in the housing, the stepped piston including an axial channel and a valve seat at the entrance of the axial channel, the stepped piston being slidable from a predetermined inactive position in the closing direction against the force of a valve spring bearing against a fixed stop; and a spring-loaded closure member whose inactive position is defined by a support formed in the housing.

In a known brake pressure control valve of the aforementioned type, such as disclosed in German Patent DE-OS No. 2,938,140, following the thread for the threaded plug, the housing includes a first bore of larger diameter. Adjacent thereto via a step is a bore of smaller diameter in which the smaller-diameter portion of the stepped piston is guided. An end portion constructed as a threaded pipe includes an enlarged bore wherein the closure member is held. The valve spring is supported on the step of the housing and urges a flange on the stepped piston against the end face of the threaded plug. When screwing in the threaded plug, both the preload of the valve spring and the closure travel are changed in this construction. Therefore, a considerable deviation of the control valve's operational values has to be put up with.

SUMMARY OF THE INVENTION

It is an object of the present invention to provide a brake pressure control valve of the type referred to hereinabove which makes it possible to maintain the operational values with an appreciably greater accuracy.

A feature of the present invention is the provision of a brake pressure control valve for a vehicular brake system comprising: a housing having a longitudinal axis, an inlet adjacent one end thereof coaxial of the axis and an outlet adjacent the other end thereof coaxial of the axis; a threaded plug screwed into the housing at the outlet coaxial of the axis, the plug having a first bore therein coaxial of the axis; a stepped piston disposed in the housing coaxial of the axis having a larger-diameter portion guided in the first bore and a smaller-diameter portion guided in a second bore formed in the housing adjacent the inlet coaxial of the axis, the piston having a channel therein coaxial of the axis, the channel having a valve seat at an end thereof adjacent the inlet, the piston being axially slidable from a predetermined inactive position in a closing direction of the valve against the force of a valve spring bearing against a fixed stop secured to the plug; and a spring-loaded valve-closure member disposed in the housing coaxial of the axis adjacent the inlet in a cooperative relationship with the valve seat, the closure member having an inactive position defined by a support formed in the housing.

In this construction, the preload of the valve spring is not dependent upon the screwing-in of the threaded plug. The preload has rather been already defined exactly prior to the mounting. When adjusting the closure travel, the adjustment of the preloading force is left unchanged. Therefore, the closure travel is able to be adjusted to a very precise value with the aid of the threaded plug. For example, the loss in fluid at the outlet during actuation of the brake pressure control valve can be maintained at a low amount. Moreover, the stop combines the threaded plug, the stepped piston and the valve spring into a constructional unit. This permits the control valve to be preassembled, affords ease of mounting and dismounting and can be replaced to provide an existing brake pressure control valve with a different characteristic curve.

Fastening the stop to the threaded plug can be effected by a variety of methods, for instance, by screwing, welding or soldering. A particularly simple embodiment is attained in that the fixed stop is formed at one end of a spring cage whose other end is secured in an indentation at the periphery of the threaded plug.

It is favorable in this arrangement if the stop is fastened to the threaded plug while stop and threaded plug are compressed with the preloading force prescribed for the spring. This method provides all springs of a series with exactly the same amount of preloading force.

In addition, the bore formed in the housing can be constructed in a housing insert which is caulked or sealed in the housing and forms the support for the closure member. This affords a very simple type of construction for the housing. The threaded pipe on the inlet side is of a small diameter. A caulking or sealing tool can engage the free end face of the housing insert because this end face is not required to serve as a stop for the valve spring.

The exact change-over point or the exact closure travel can be set during assembly by screwing in the threaded plug upon simultaneous introduction of the change-over pressure at the inlet, until the closing position is attained, and then locking the threaded plug against rotational movement in this attained position.

BRIEF DESCRIPTION OF THE DRAWING

The above-mentioned and other objects and features of the present invention and the manner of obtaining them will become more apparent by reference to the following description taken in conjunction with the drawing, the single FIGURE of which is a longitudinal cross-sectional view of a brake pressure control valve in accordance with the principles of the present invention.

DESCRIPTION OF THE PREFERRED EMBODIMENT

A housing 1 includes a bore 2, which is provided with a thread 3 for accommodation of a threaded plug 4 on the outlet side, and a threaded pipe 5 on the inlet side having an axial channel 6. A housing insert 7 is inserted in housing 1 and secured by a caulked or sealed edge 8. A sealing ring 9 is seated in an annular groove of insert 7. This causes formation of an inlet chamber 10 wherein a plate 11 with a closure member 12 is disposed. Plate 11 is urged against a support 14, which is formed in housing 1 at housing insert 7 by the action of a spring 13, the inactive position of closure member 12 being thereby defined. Also in this position, channels 15 in plate 11 establish a connection between inlet chamber 10 and the effective surface of closure member 12. Smaller-diameter portion 17 of a stepped piston 18 is guided in a bore 16 of housing insert 7 in a sealed relationship thereto. Larger-diameter portion 19 of stepped piston 18 is guided in a bore 20 of threaded plug 4 in a sealed relationship thereto. Bore 20 also provides an outlet chamber 21 communicating with a port 22 on the outlet side of the control valve. Stepped piston 18 includes an axial channel 23 having at its end close to the inlet side of the control valve a valve seat 24 which cooperates with closure member 12.

A valve spring 25 has one end supported on a fixed stop 26 which is formed in a spring cage 27. The other end 28 of spring cage 27 is secured in an annular groove 29 of threaded plug 4. Valve spring 25 acts on the stepped piston via a circlip 30. The inactive position of stepped piston 18 is defined by abutment of circlip 30 at the end face 31 of threaded plug 4.

When assembling this control valve, a constructional unit is preassembled prior to the final assembly which comprises threaded plug 4, stepped piston 18, valve spring 25, circlip 30 and spring cage 27. In this arrangement, end 28 of spring cage 27 is of cylindrical shape first. Spring cage 27 is then urged against threaded plug 4 by a force which is equal to the desired preloading force of valve spring 25. The securing of end 28 is carried out in this state. This permits fitting all springs with the desired preload independently of their manufacturing tolerances. In addition, a second constructional unit will be preassembled which comprises housing 1, housing insert 7, plate 11 and spring 13. Now both constructional units are interconnected by screwing in threaded plug 4. While screwing in, the change-over pressure is introduced via channel 6 on the inlet side of the control valve. When the valve closes, the screw-in position of plug 4 is secured by impressing a part 32 of the housing material into an annular indentation 33 of threaded plug 4. From this method results the exact closure travel a for valve 12, 24 which is in its inactive position. Likewise, other manufacturing tolerances, not only those of the spring, are eliminated by these means. This renders possible an extremely precise adjustment of the closure travel and the change-over point.

The operation of the braking pressure control valve manufactured as described above is as usual. When the inlet pressure $P_e$ increases continuously, the outlet pressure $P_A$ will first equal this inlet pressure. However, on account of the different cross-sectional surfaces of the steps of stepped piston 18, stepped piston 18 will be urged to the right as soon as the amount of preload of valve spring 25 has been exceeded. Following the predetermined short closure travel a, valve seat 24 meets closure member 12. With the inlet pressure $P_E$ continuing to rise, the characteristic curve of the outlet pressure $P_A$ will have a less steep inclination than the one of the inlet pressure due to the ratio of the different cross-sectional surfaces of stepped piston 18.

While we have described above the principles of our invention in connection with specific apparatus, it is to be clearly understood that this description is made only by way of example and not as a limitation to the scope of our invention as set forth in the objects thereof and in the accompanying claims.

We claim:

1. A brake pressure control valve for a vehicular brake system comprising:

a housing having a longitudinal axis, a single inlet adjacent one end thereof coaxial of said axis and a single outlet adjacent the other end thereof coaxial of said axis;

a threaded plug screwed into said housing at said outlet coaxial of said axis, said plug having a first bore therein coaxial of said axis;

a stepped piston disposed in said housing coaxial of said axis having a larger-diameter portion guided in said first bore and a smaller-diameter portion guided in a second bore formed in said housing adjacent said inlet coaxial of said axis, said piston having a channel therein coaxial of said axis, said channel having a valve seat at an end thereof adjacent said inlet, said piston being axially slidable from a predetermined inactive position in a closing direction of said valve against the force of a valve spring bearing against a fixed stop adjacent said second bore, said fixed stop being secured to said plug adjacent said first bore; and a spring-loaded valve closure member disposed in said housing coaxial of said axis adjacent said inlet in a cooperative relationship with said valve seat, said closure member having an inactive position defined by a support formed in said housing.

2. A control valve according to claim 1, wherein said fixed stop is disposed at one end of a spring cage adjacent said second bore, said spring cage having its other end secured in a first indentation at the periphery of said plug adjacent of said first bore.

3. A control valve according to claims 1 or 2, further including
   a housing insert secured in said housing adjacent said inlet, said insert having said second bore and said support for said closure member.

4. A control valve according to claim 3, wherein said plug is locked against rotational movement by deformation of material.

5. A control valve according to claim 4, wherein said plug has a second indentation in the periphery thereof into which material of said housing is forced.

6. A control valve according to claim 5, wherein said fixed stop is fastened to said plug while a preloading force prescribed for said valve spring is applied to said fixed stop and said plug.

7. A control valve according to claim 6, wherein said plug is screwed into said housing while simultaneously a change-over pressure is introduced at said inlet until a closing position of said valve is attained, said plug being locked against rotational movement upon attainment of said closing position.

8. A control valve according to claims 1 or 2, wherein said plug is locked against rotational movement by deformation of material.

9. A control valve according to claim 8, wherein said plug has a second indentation in the periphery thereof into which material of said housing is forced.

10. A control valve according to claim 9, wherein said fixed stop is fastened to said plug while a preloading force prescribed for said valve spring is applied to said fixed stop and said plug.

11. A control valve according to claim 10, wherein said plug is screwed into said housing while simultaneously a change-over pressure is introduced at said inlet until a closing position of said valve is attained, said plug being locked against rotational movement upon attainment of said closing position.

12. A control valve according to claims 1 or 2, wherein said fixed stop is fastened to said plug while a preloading force prescribed for said valve spring is applied to said fixed stop and said plug.

13. A control valve according to claim 12, wherein said plug is screwed into said housing while simultaneously a change-over pressure is introduced at said inlet until a closing position of said valve is attained, said plug being locked against rotational movement upon attainment of said closing position.

14. A control valve according to claims 1 or 2, wherein
said plug is screwed into said housing while simultaneously a change-over pressure is introduced at said inlet until a closing position of said valve is attained, said plug being locked against rotational movement upon attainment of said closing position.

* * * * *